United States Patent
Grenzi

(10) Patent No.: US 8,851,582 B2
(45) Date of Patent: Oct. 7, 2014

(54) TRACK WITH ROTATING BUSHINGS FOR TRACK-TYPE VEHICLES

(75) Inventor: Francesco Grenzi, Ferrara (IT)

(73) Assignee: Berco S.p.A., Copparo (Ferrara) (IT)

( * ) Notice: Subject to any disclaimer, the term of this patent is extended or adjusted under 35 U.S.C. 154(b) by 395 days.

(21) Appl. No.: 13/138,671

(22) PCT Filed: Jan. 27, 2010

(86) PCT No.: PCT/IB2010/000147
§ 371 (c)(1),
(2), (4) Date: Nov. 22, 2011

(87) PCT Pub. No.: WO2010/109277
PCT Pub. Date: Sep. 30, 2010

(65) Prior Publication Data
US 2012/0068530 A1  Mar. 22, 2012

(30) Foreign Application Priority Data
Mar. 24, 2009  (IT) .............................. MI2009A0462

(51) Int. Cl.
*B62D 55/21* (2006.01)

(52) U.S. Cl.
CPC .................................... *B62D 55/21* (2013.01)
USPC ........................... 305/201; 305/103; 305/202

(58) Field of Classification Search
CPC ... B62D 55/0887; B62D 55/21; B62D 55/211
USPC ......... 305/102, 103, 104, 105, 106, 200, 201, 305/202, 203, 204, 59
See application file for complete search history.

(56) References Cited

U.S. PATENT DOCUMENTS

| | | | |
|---|---|---|---|
| 4,126,359 A * | 11/1978 | Holze | 305/118 |
| 4,150,856 A * | 4/1979 | Hakkenberg et al. | 305/106 |
| 4,277,199 A * | 7/1981 | Livesay | 403/317 |

(Continued)

FOREIGN PATENT DOCUMENTS

| | | |
|---|---|---|
| DE | 39 03 617 C1 | 4/1990 |
| EP | 1 258 419 A1 | 11/2002 |
| WO | WO2008/007494 A1 | 1/2008 |

OTHER PUBLICATIONS

PCT Search Report dated Jul. 29, 2010.

*Primary Examiner* — Kip T Kotter
(74) *Attorney, Agent, or Firm* — Hedman & Costigan, P.C.; James V. Costigan; Kathleen A. Costigan

(57) ABSTRACT

A track (10) for track-type vehicles is described, comprising a continuous sequence of articulated joints (12, 12') of the hinge type, oriented according to a first axis (A-A) substantially perpendicular to the central longitudinal development axis (B-B) of the track (10). The articulated joints (12, 12'), provided with pins (36, 36'), are connected to each other and maintained at a constant distance through pairs of links (14) having longitudinal development, arranged laterally and symmetrically with respect to the longitudinal central axis (B-B). Around each pin (36, 36') a bushing (40) is mounted free to rotate with respect to the pin (36, 36') itself and between each pin (36, 36') and the links (14) at least one sliding bearing (44) is press-fitted. The geometric/size characteristics of the links (14) and of the sliding bearings (44) make it possible to improve the stability and the resistance to fatigue and wearing of the articulated joints (12, 12') of the track (10).

10 Claims, 4 Drawing Sheets

(56) References Cited

U.S. PATENT DOCUMENTS

| | | |
|---|---|---|
| 5,016,945 A | 5/1991 | Bentz |
| 5,183,318 A | 2/1993 | Taft |
| 6,270,173 B1 | 8/2001 | Hashimoto |
| 6,457,304 B1 * | 10/2002 | Bedford et al. .................... 59/7 |
| 6,564,539 B2 * | 5/2003 | Bedford et al. .................... 59/7 |
| 6,883,876 B2 * | 4/2005 | Yamamoto et al. ........... 305/115 |
| 7,325,889 B2 * | 2/2008 | Yamamoto et al. ........... 305/201 |
| 7,354,200 B2 * | 4/2008 | Yamamoto et al. ........... 384/375 |
| 7,815,262 B2 * | 10/2010 | Maeda ........................... 305/198 |
| 7,946,662 B2 * | 5/2011 | Maeda ........................... 305/198 |
| 8,075,192 B2 * | 12/2011 | Yamamoto et al. ........... 305/202 |
| 2003/0000747 A1 | 1/2003 | Sugiyama |
| 2004/0012260 A1 | 1/2004 | Yamamoto |
| 2009/0230763 A1 | 9/2009 | Sakai |

* cited by examiner

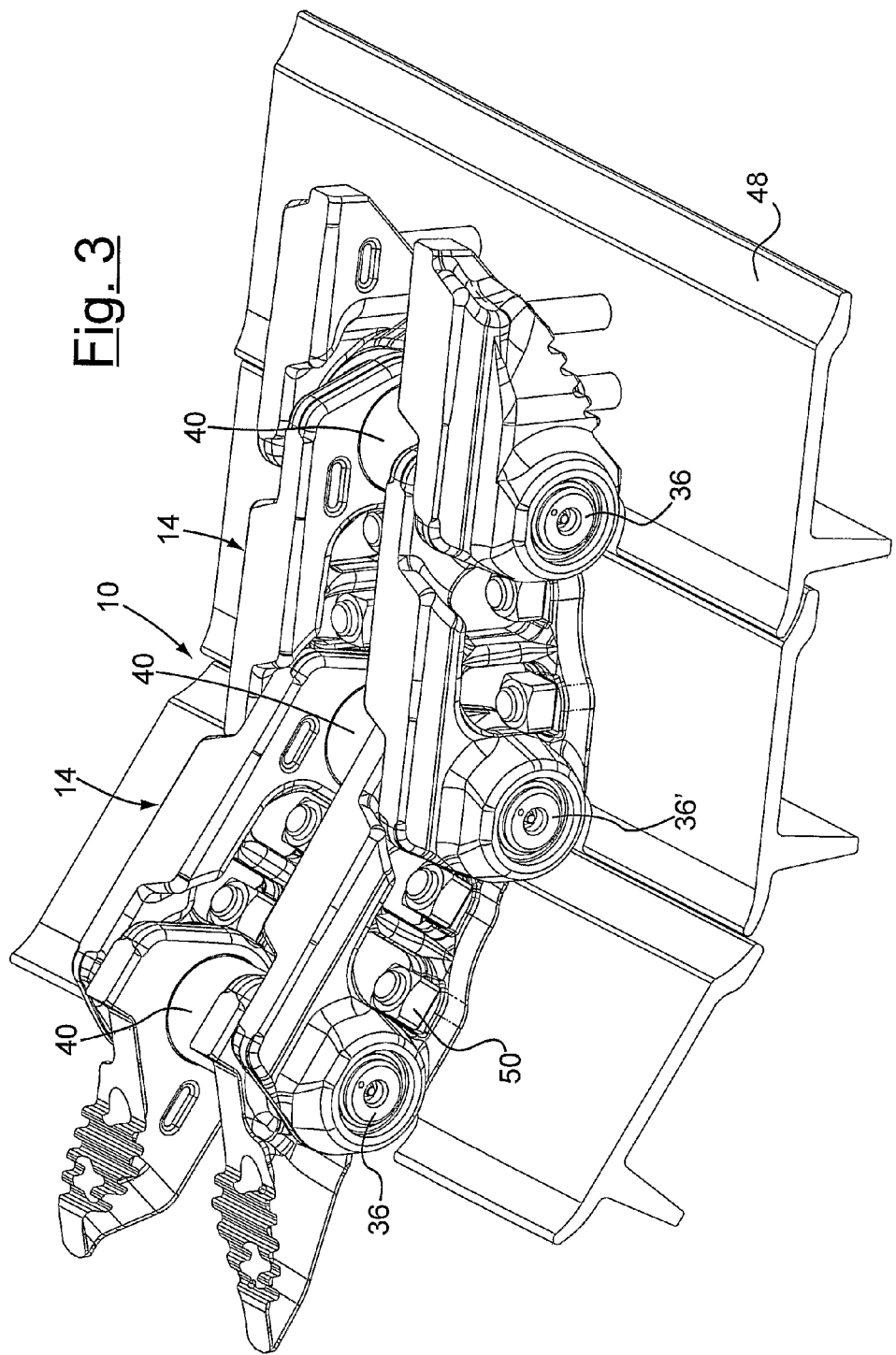

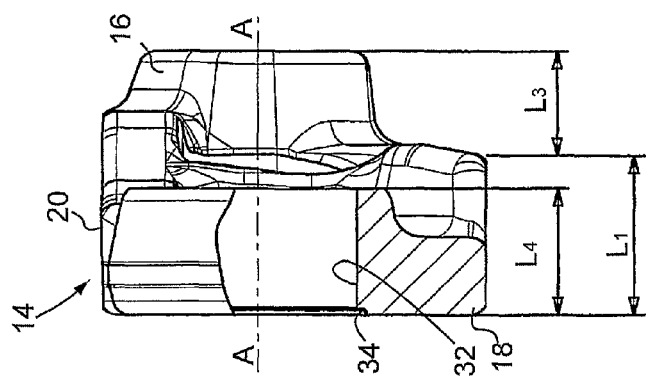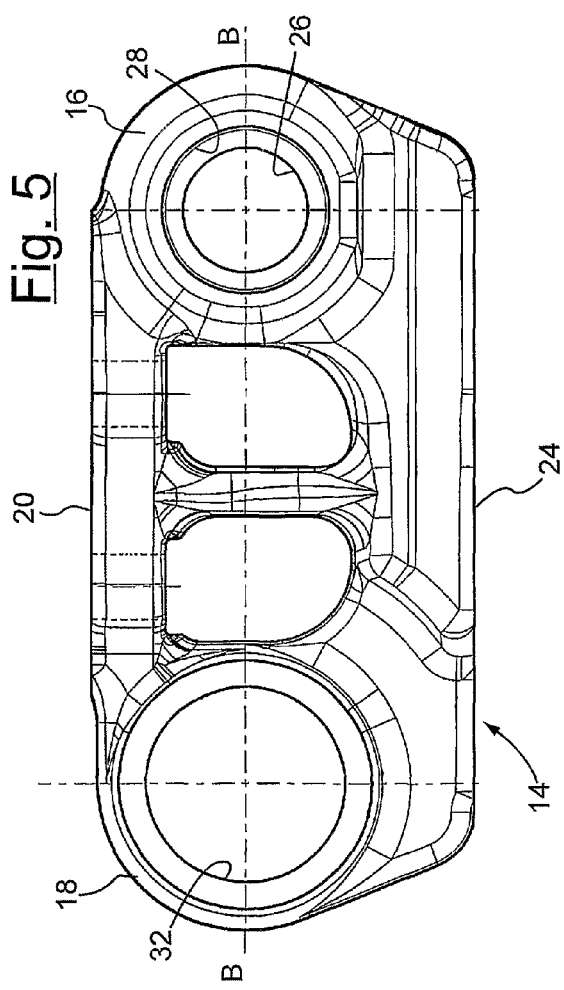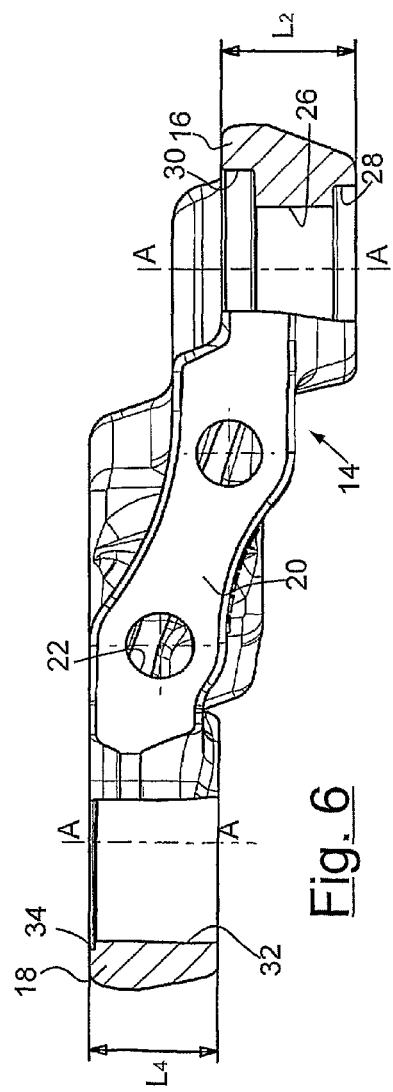

TRACK WITH ROTATING BUSHINGS FOR TRACK-TYPE VEHICLES

The present invention refers to a track with rotating bushings for track-type vehicles, in particular but not exclusively a track with rotating bushings for track-type vehicles intended for ground movement.

The tracks of a track-type work vehicle generally comprise a pair of parallel tracks, each obtained through a continuous sequence of hinge type articulated joints, connected to each other and maintained at a constant distance through suitable rigid connecting members, called "links" of the track. The tracks also comprise a plurality of bushings and pins, interposed between the links so as to connect their ends to form the tracks. The bushings and the supported links cooperate with each other to form a plurality of track joints, which allow the necessary rotational movement between adjacent links. This allows the articulation of the adjacent links when the track rotates wound around the (driving and/or driven) wheels of the track-type vehicle. The rotation of the track allows the track-type vehicle to move on the ground to carry out the many functions for which it is intended.

When the track-type vehicle, typically a machine intended for ground movement, is operating on highly abrasive terrains, some of the components of the tracks must be periodically replaced since they undergo rapid wearing. In conventional type tracks, the replacement of one component of the track usually requires the track itself to be removed from the vehicle, carried out at a suitably equipped assistance centre. Consequently, the replacement procedure of the worn elements is very expensive and takes up a lot of time.

In particular, amongst the elements of a conventional track which undergo the most wearing there are without a doubt the bushings, each interposed between each connection pin between the links and the members necessary for transmitting motion to the tracks. The bushings are thus fixed with respect to the links of the track. The fixed bushings undergo substantial sliding friction, which cause both their internal and external cylindrical surfaces to deteriorate rapidly.

A partial decrease of the wearing of the bushings has been obtained with the release onto the market of the so called lubricated tracks, in which, thanks to the circulation of lubricant, the internal wearing of the bushings when sliding with the respective pins has practically nullified. However, the wearing problem of the external cylindrical surface of the bushings remains the same even with lubricated tracks. Tracks for track-type vehicles have thus been made in which the bushings are free to rotate with respect to the relative pin around which they are wound. In this way, during the movement of the tracks, the bushings mainly undergo rolling friction instead of sliding friction, with consequent greater resistance to wearing of the bushings themselves.

A track for track-type vehicles, according to the prior art, of the type provided with rotating bushings, is described, for example, in the U.S. Pat. No. 5,183,318 to Caterpillar Inc.

However, also the tracks provided with rotating bushings made to this day still have drawbacks.

A first drawback is due to the reduction of the structural rigidity of the entire tracks with respect to the tracks provided with fixed bushings. This reduction of the structural rigidity is due to the fact that the rotating bushings do not rigidly connect the links of the track.

Another drawback is due to the fact that the presence of the rotating bushings makes it necessary to have other rigid connecting elements between the links of the track and the relative pins. These connecting elements are typically made up of sliding bearings coaxially mounted around the pin and inside suitable through holes foreseen on each link. Such sliding bearings must withstand all the stresses which the track undergoes in the working steps of the track-type vehicle, without compromising the integrity of the joints. It is also necessary to foresee sealing systems, which are able to prevent corrosive and abrasive mixtures of water, dirt, sand, stone or other mineral or chemical elements, to which the track is exposed to during its use, from entering into the joints.

It should thus be obvious that, if on one hand the rotating bushings undergo less wearing with respect to the fixed bushings fitted into the links, on the other hand the tracks with rotating bushings require there to be some specific elements which carry great loads and that thus have a shorter operative life than that of other elements of the track.

The general purpose of the present invention is therefore that of making a track with rotating bushings for track-type vehicles, able to increase not only the life and the wearing of the bushings, but also that of the other elements that form the joints of the track with respect to the tracks according to the prior art.

Another purpose of the invention is that of providing a track with rotating bushings for track-type vehicles, which makes it possible to obtain a balanced level of wearing for all the components belonging to the track itself, with the consequent possibility of better planning the maintenance operations on the track-type vehicle.

Yet another purpose of the invention is that of being able to have a track with rotating bushings for track-type vehicles, that is easy to repair and that is interchangeable with other analogous tracks of the known type.

These purposes according to the present invention are achieved by making a track with rotating bushings for track-type vehicles comprising a continuous sequence of articulated joints (12, 12') of the hinge type, and comprising pins (36, 36') oriented according to a first axis (A-A) substantially perpendicular to the central longitudinal development axis (B-B) of the track (10), said articulated joints (12, 12') being connected to each other and maintained at a constant distance through pairs of links (14) having longitudinal development, arranged laterally and symmetrically with respect to said longitudinal central axis (B-B), each link (14) being provided with a first end flange (16) facing outwards of the track (10), with reference to said longitudinal central axis (B-B), and with a second end flange (18) facing inwards of the track (10), with reference to said longitudinal central axis (B-B), each link (14) being provided with a first upper surface (20) and a second lower guide surface (24), opposite with respect to said first upper surface (20), made on said first end flange (16) being a first through hole (26), oriented according to said first axis (A-A), for the non-rotatable connection of said link (14) with one of the pins (36, 36') of said articulated joint (12, 12'), and made on said second end flange (18) being a second through hole (32), oriented according to said first axis (A-A), for the rotatable connection of said link (14) with one of said pins (36, 36'), characterized in that:

the ratio $R_1$ between the overall width $L_1$ of said second lower guide surface (24) and the overall-thickness ($L_2$) of said first end flange (16) is comprised in the range between 1.1 and 1.3, the ratio ($R_2$) between the overall width (Li) of said second lower guide surface (24) and the offset ($L_3$) between the external surface of said first end flange (16) and the external edge of said second lower guide surface 24 is comprised in the range between 1.4 and 1.65, and the ratio ($R_3$) between the overall thickness ($L_2$) of said first end flange (16) and the overall thickness ($L_4$) of said second end flange (18) is comprised in the range between 1 and 1.1, and in that at least one annular-shaped sliding bearing (44) is housed inside said second through hole (32) of each link (14), the ratio (Ro) between the length (S) and the related internal diameter (D) of said sliding bearing (44) being greater than 0.60.

Further characteristics of the invention are highlighted in the dependent claims, which are integral part of the present description.

The characteristics and the advantages of a track with rotating bushings for track-type vehicles according to the present invention shall become clearer from the following description, given as an example and not for limiting purposes, with reference to the attached schematic drawings in which:

FIG. 3 is a perspective view of the portion of track with rotating bushings of FIG. 1, combined with the shoes of the tracks of the vehicle;

FIG. 5 is a side view of a link belonging to the track with rotating bushings obtained according to the present invention;

FIG. 6 is a partial section plan view of the link of FIG. 5; and

FIG. 7 is another partial section top side view of the link of FIG. 5.

Figure 2:
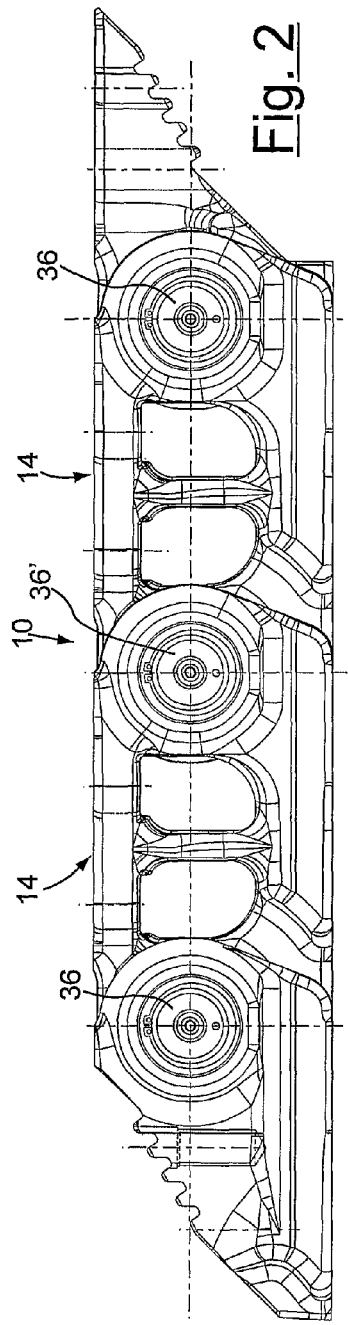
FIG. 2 is a side view of the portion of track with rotating bushings of FIG. 1.
Figure 1:
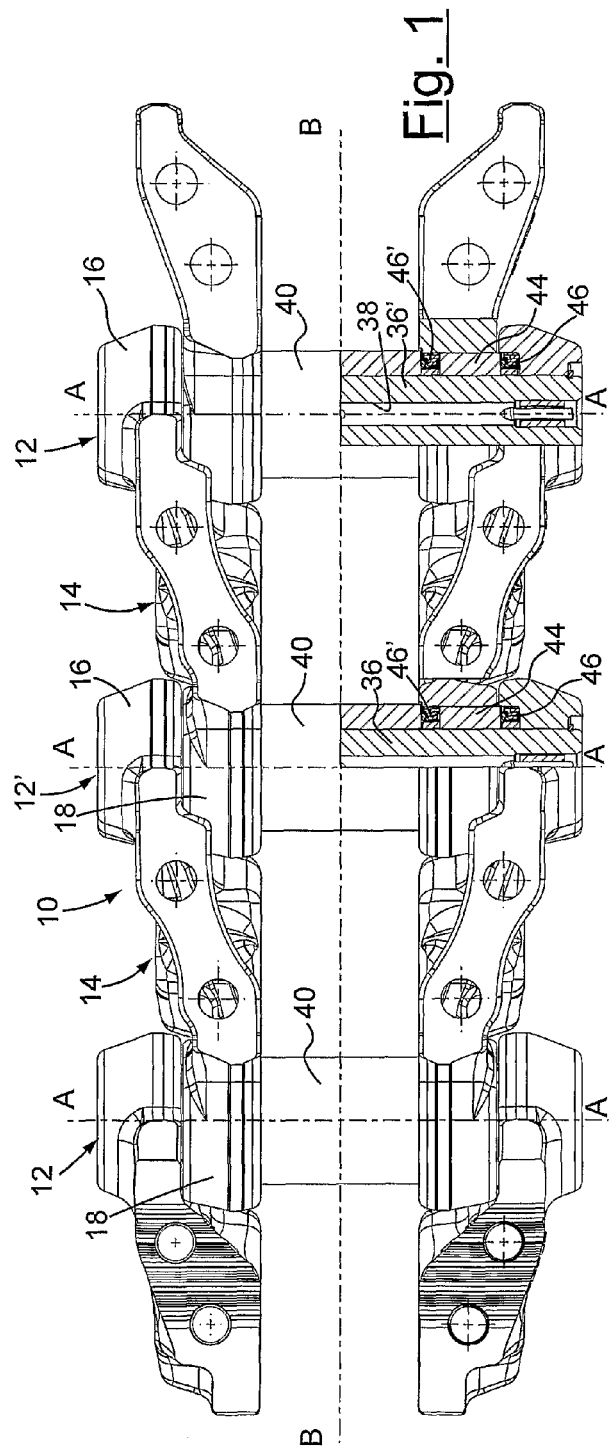
FIG. 1 is a plan view of a portion of track with rotating bushings for track-type vehicles obtained according to the present invention.

With reference to the figures, a portion of track is shown, which has rotating bushings according to the present invention, wholly indicated with reference numeral 10.

The track 10 substantially consists of a continuous sequence of articulated joints 12, 12' of the hinge type, oriented according to an axis A-A substantially perpendicular to the central longitudinal development axis B-B of the track 10.

The articulated joints 12, 12' are connected to each other and maintained at a constant distance through pairs of links 14 having longitudinal development, arranged laterally and symmetrically with respect to the longitudinal central axis B-B of the track 10.

Each link 14 is of the asymmetrical type, that is to say provided with a first end flange 16 facing outwards the track 10, if seen with reference to the longitudinal central axis B-B, and with a second end flange 18 facing inwards the track 10 or, in other words, towards the longitudinal central axis B-B of the track 10 itself.

Each link 14 is thus provided with a first, substantially flat, upper surface 20 intended to irremovably support the shoes 48 (FIG. 3), which complete the tracks of the vehicle. For such a purpose, on the first upper surface 20 of each link 14 one or more through holes 22 are performed intended to receive the engagement means 50, usually bolts, between the link 14 itself and the relative shoe 48 intended to rest on the ground.

Each link 14 is moreover provided with a second, also substantially flat, lower guide surface 24 opposite with respect to the first upper surface 20 and intended to be engaged with the driven wheels, the lower rollers and the upper rollers for supporting the track, of the track-type vehicle.

On the first end flange 16, facing outwards the track 10, of every link 14, a first through hole 26 is obtained oriented according to an axis A-A perpendicular to the longitudinal central axis B-B of the track 10. At the two opposite ends of the through hole 26 a first annular groove 28, facing outwards the track 10, and a second annular groove 30, facing inwards the track 10, the functions of which shall be specified hereafter, are then respectively obtained. In particular, the external 28 and internal 30 annular grooves have an internal diameter which is greater with respect to the internal diameter of the through hole 26. Even more specifically, the internal annular groove 30 has an internal diameter which is greater with respect to the internal diameter of the external annular groove 28.

Similarly, on the second end flange 18, facing inwards the track 10, of every link 14, a second through hole 32, also oriented according to an axis A-A perpendicular to the longitudinal central axis B-B of the track 10, is made. At one of the two opposite ends of such a through hole 32, in this case, the end facing inwards the track 10, an annular groove 34 the internal diameter of which is greater than the internal diameter of the adjacent through hole 32, is then made. In addition, as can be seen from the section of FIG. 4, the internal diameters of the second through hole 32 and of the internal annular groove 30 of the first through hole 26 are substantially equal. This characteristic allows particular elements of the track 10, which shall be specified soon after, to be inserted inside the second through hole 32 and the internal annular groove 30 of the first through hole 26.

With reference now to the articulated joints 12, 12', each one of them is mainly made up of a substantially cylindrical pin 36, 36', oriented along an axis A-A perpendicular to the longitudinal central axis B-B of the track 10. Each pin 36, 36' is provided inside with channelings 38 (FIG. 4) intended for the circulation of the lubricant fluid, necessary for the track 10 to work properly. Around each pin 36, 36', and coaxially with respect to it, a bushing 40 free to rotate with respect to the pin 36, 36' itself is mounted. On the external circumferential surface of the rotating bushings 40 the teeth of the driving wheels of the track-type vehicle engage, in a manner such as to set the whole track system in motion.

Each one of the links 14 is connected to a corresponding pin 36 through interference coupling, i.e. in a non-rotatable manner, of its outward facing end flange 16 with one of the ends of the pin 36 itself. In other words, each link 14 is mounted around the relative pin 36 through its insertion inside the through hole 26 foreseen on the first end flange 16 facing outside of the link 14 itself. According to one preferred embodiment of the track 10, illustrated in the figures, the locking into position between the first end flange 16 facing outwards with respect to the link 14 and the end of the pin 36 is obtained by means of a ring 42 of the "Seeger" type, integrally joined with the pin 36 itself and housed inside the external annular groove 28 foreseen on such an end flange 16.

Figure 4:
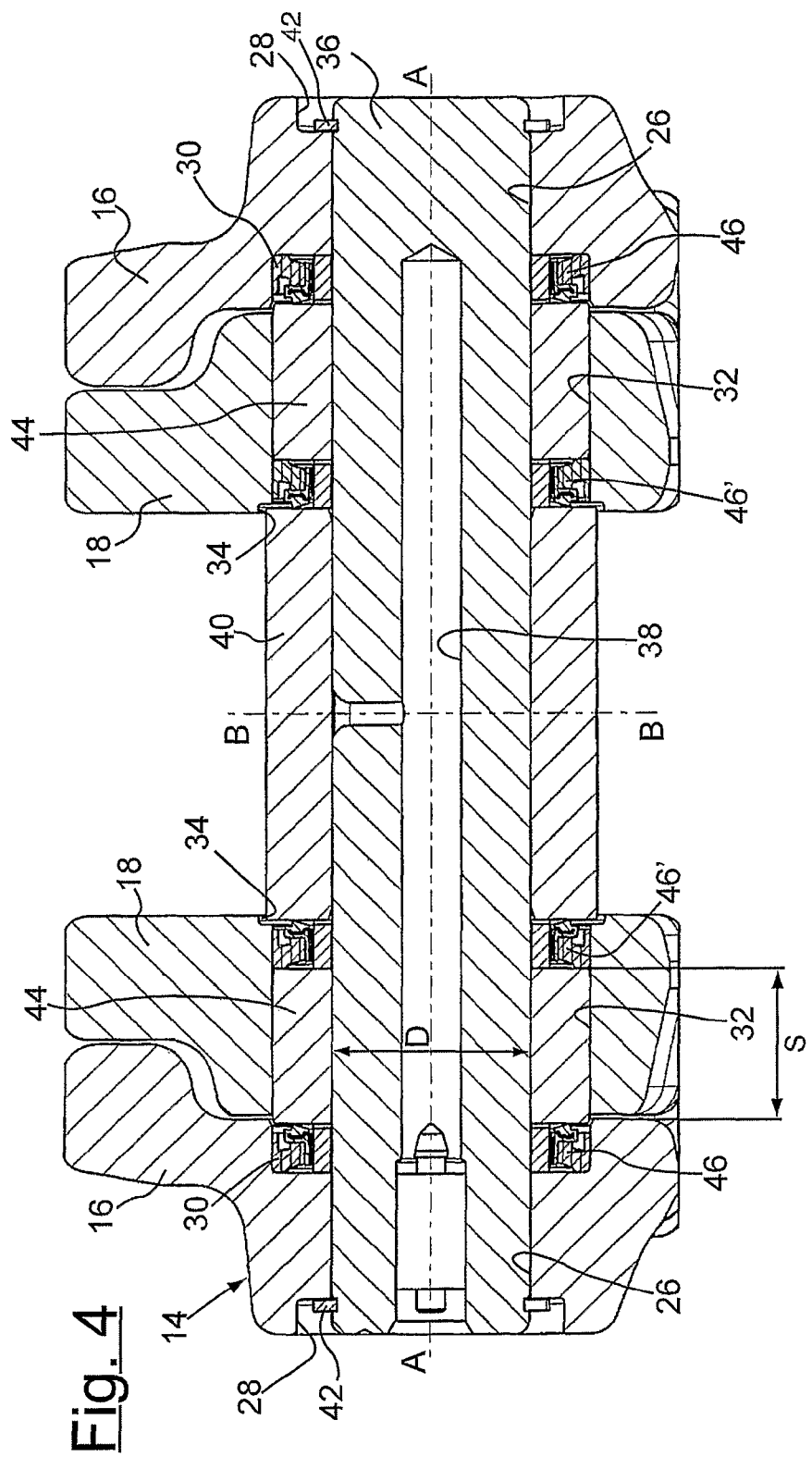
FIG. 4 is a section view, obtained along the line A-A of FIG. 1, of the track with rotating bushings obtained according to the present invention.

Each link 14 is moreover rotatably connected to the next pin 36' through the insertion of the latter inside the through hole 32 foreseen on the second end flange 18 facing inwards with respect to the link 14 itself. As shown in the section of FIG. 4, inside of each through hole 32 at least one annular-shaped sliding bearing 44 is then housed. More precisely, each sliding bearing 44 is housed, press-fitted, between the internal circumferential surface of each through hole 32 and the external circumferential surface of one of the pins 36, 36', guaranteeing the free rotation around the axis A-A thereof.

The sliding bearings 44 are made from a metallic material and their resistance to the stresses undergone by the track 10 of the track-type vehicle in the work steps, depends upon the size characteristics of the aforementioned bearings. Therefore, according to the invention, the ratio $R_0$ between the length S and the related internal diameter D of each sliding bearing 44 is greater than 0.60. Preferably, such a ratio is greater than 0.65.

Basically, with reference to the values outlined in FIG. 4:

$$R_0 = \frac{S}{D} > 0.60$$

Preferably:

$$R_0 > 0.65$$

As shown in the section of FIG. 4, in the mounted configuration of the track 10, on the sides of each sliding bearing 44, sealing groups 46, 46' are provided intended to cooperate with the rotating bushings 40, the links 14 and the sliding bearings 44 themselves to provide a sealing system for the articulated joints 12, 12'. In detail, for each sliding bearing 44, one of the sealing groups 46 is housed inside the second annular groove 30, facing inwards the track 10, made at the first through hole 26 of each link 14, whereas the other sealing group 46' is interposed between the sliding bearing 44 itself and the rotating bushing 40 and it is housed inside the second through hole 32 of each link 14. The sealing groups 46 can be of the type described in the international patent application No. WO2008/093160, to the same Applicant, and shall not be explained in detail hereafter.

According to a preferred embodiment of the present invention, in order to increase the structural rigidity of the links 14 and, consequently, of the entire track 10, it has been found that the ratio $R_1$ between the overall width $L_1$ of the lower guide surface 24 of each link 14 and the overall thickness $L_2$ of the first end flange 16, facing outwards the track 10, of the link 14 itself must be greater than 1. Preferably, such a ratio $R_1$ is comprised in the range between 1.1 and 1.3.

Moreover, the ratio $R_2$ between the overall width $L_1$ of the lower guide surface 24 of each link 14 and the offset $L_3$ between the external surface of the first end flange 16, at the first annular groove 28, and the external edge of the lower guide surface 24 of the link 14 itself must be greater than 1.35. Preferably, such a ratio $R_2$ is comprised in the range between 1.4 and 1.65.

Finally, the ratio $R_3$ between the overall thickness $L_2$ of the first end flange 16, and the overall thickness $L_4$ of the second end flange 18, facing inwards the track 10, of the link 14 itself must be smaller than 1.25. Preferably, such a ratio $R_3$ is comprised in the range between 1 and 1.1. Basically, with reference to the values outlined in FIGS. 6 and 7:

$$R_1 = \frac{L_1}{L_2} > 1 \quad R_2 = \frac{L_1}{L_3} > 1.35 \quad R_3 = \frac{L_2}{L_4} < 1.25$$

Preferably:

$$1.1 < R_1 < 1.3 \quad 1.4 < R_2 < 1.65 \quad 1 < R_3 < 1.1$$

The aforementioned geometrical/size characteristics of the links 14 thus make it possible to obtain an overall resistant section that is greater than that of known type links. Consequently, even if there is a bushing 40 of the rotating type, the stability of the articulated joints 12, 12' is not compromised even though the bushing 40 itself is no longer a single piece with the links connected to it, as occurs on the other hand, in the conventional type tracks with a fixed bushing. The particular size characteristics of the sliding bearings 44 finally make it possible to obtain a good resting surface for the links 14 on the relative pins 36, 36' even if such elements are deformed while loaded, as happens when the articulated joints 12, 12' undergo stress in the work steps of the track-type vehicle.

It has thus been seen that the track with rotating bushings for track-type vehicles according to the present invention achieves the purposes previously highlighted.

The track with rotating bushings for track-type vehicles of the present invention thus conceived can however undergo numerous modifications and variants, all covered by the same inventive concept; moreover, all the details can be replaced by technically equivalent elements. In practice the materials used, as well as the shapes and sizes can be any according to the technical requirements.

The scope of protection of the invention is thus defined by the attached claims.

The invention claimed is:

1. Track (10) for track-type vehicles, comprising a continuous sequence of articulated joints (12, 12') of the hinge type, and oriented according to a first axis (A-A) substantially perpendicular to the central longitudinal development axis (B-B) of the track (10), said articulated joints (12, 12') being connected to each other and maintained at a constant distance through pairs of links (14) having longitudinal development, arranged laterally and symmetrically with respect to said longitudinal central axis (B-B), each link (14) being provided with a first end flange (16) facing outwards of the track (10), with reference to said longitudinal central axis (B-B), and with a second end flange (18) facing inwards of the track (10), with reference to said longitudinal central axis (B-B), each link (14) being provided with a first upper surface (20) and a second lower guide surface (24), opposite with respect to said first upper surface (20), made on said first end flange (16) being a first through hole (26), oriented according to said first axis (A-A), for the non-rotatable connection of said link (14) with one of the pins (36, 36') of said articulated joint (12, 12'), and made on said second end flange (18) being a second through hole (32), oriented according to said first axis (A-A), for the rotatable connection of said link (14) with one of said pins (36, 36'), characterized in that:
    the ratio $R_1$ between the overall width $L_1$ of said second lower guide surface (24) and the overall thickness ($L_2$) of said first end flange (16) is comprised in the range between 1.1 and 1.3,
    the ratio ($R_2$) between the overall width (Li) of said second lower guide surface (24) and the offset ($L_3$) between the external surface of said first end flange (16) and the external edge of said second lower guide surface (24) is comprised in the range between 1.4 and 1.65, and
    the ratio ($R_3$) between the overall thickness ($L_2$) of said first end flange (16) and the overall thickness ($L_4$) of said second end flange (18) is comprised in the range between 1 and 1.1, and
    in that at least one annular-shaped sliding bearing (44) is housed inside said second through the ratio (Ro) between the length (S) and the related internal diameter (D) of said sliding bearing (44) being greater than 0.60.

2. Track (10) according to claim 1, characterized in that said ratio ($R_0$) between the length (S) and the related internal diameter (D) of said sliding bearing (44) is greater than 0.65.

3. Track (10) according to claim 1, characterized in that said sliding bearing (44) is press-fitted between the internal circumferential surface of said second through hole (32) and the external circumferential surface of said pin (36, 36'), guaranteeing the free rotation around said first axis (A-A) thereof.

4. Track (10) according to claim 1, characterized in that mounted around said pin (36, 36'), and coaxially with respect thereto, is a bushing (40) free to rotate with respect to said pin (36, 36').

5. Track (10) according to claim 4, characterized in that two sealing groups (46, 46') are provided on each side of said sliding bearings (44), said sealing groups (46, 46') being intended to cooperate with said bushing (40), said links (14) and said sliding bearings (44) to provide a sealing system for the articulated joints (12, 12').

6. Track (10) according to claim 5, characterized in that a first of said sealing groups (46) is housed inside an annular groove (30) facing inwards of the track (10), with reference to said longitudinal central axis (B-B), obtained at said first through hole (26).

7. Track (10) according to claim 6, characterized in that a second of said sealing groups (46') is interposed between said sliding bearing (44) and said rotating bushing (40), and it is housed inside said second through hole (32).

8. Track (10) according claim 1, characterized in that the non-rotatable connection of said link (14) with said pin (36, 36') is obtained by means of a ring (42) of the "Seeger" type, integrally joined with said pin (36, 36') and housed inside an annular groove (28) facing outwards of the track (10), with reference to said longitudinal central axis (B-B), obtained on said first end flange (16) at said first through hole (26), said ring (42) providing the locking in position between said first end flange (16) and the end of said pin (36, 36').

9. Track (10) according to claim 1, characterized in that said sliding bearing (44) is press-fitted between the internal circumferential surface of said second through hole (32) and the external circumferential surface of said pin (36, 36'), guaranteeing the free rotation around said first axis (A-A) thereof.

10. Track (10) for track-type vehicles, comprising a continuous sequence of articulated joints (12, 12') of the hinge type, and comprising pins (36, 36') oriented according to a first axis (A-A) substantially perpendicular to the central longitudinal development axis (B-B) of the track (10), said articulated joints (12, 12') being connected to each other and maintained at a constant distance through pairs of links (14) having longitudinal development, arranged laterally and symmetrically with respect to said longitudinal central axis (B-B), each link (14) being provided with a first end flange (16) facing outwards of the track (10), with reference to said longitudinal central axis (B-B), and with a second end flange (1.8) facing inwards of the track (10), with reference to said longitudinal central axis (B-B), each link (14) being provided with a first upper surface (20) and a second lower guide surface (24), opposite with respect to said first upper surface (20), made on said first end flange (16) being a first through hole (26), oriented according to said first axis (A-A), for the non-rotatable connection of said link (14) with one of the pins (36, 36') of said articulated joint (12, 12'), and made on said second end flange (18) being a second through hole (32), oriented according to said first axis (A-A), for the rotatable connection of said link (14) with one of said pins (36, 36'), characterized in that:

the ratio ($R_1$) between the overall width ($L_1$) of said second lower guide surface (24) and the overall thickness ($L_2$) of said first end flange (16) is comprised in the range between 1.1 and 1.3, the ratio ($R_2$) between the overall width ($L_1$) of said second lower guide surface (24) and the offset ($L_3$) between the external surface of said first end flange (16) and the external edge of said second lower guide surface (24) is comprised in the range between 1.4 and 1.65, and the ratio ($R_3$) between the overall thickness ($L_2$) of said first end flange (1.6) and the overall thickness ($L_4$) of said second end flange (18) is comprised in the range between 1 and 1.1 in that at least one annular-shaped sliding bearing (44) is housed inside said second through hole (32) of each link (14), the ratio (Ro) between the length (S) and the related internal diameter (D) of said sliding bearing (44) being greater than 0.60 wherein a non-rotatable connection of said link (14) with said pin (36, 36') is obtained by means of a ring (42) of the "Seeger" type, integrally joined with said pin (36, 36') and housed inside an annular groove (28) facing outwards of the track (10), with reference to said longitudinal central axis (B-B), obtained on said first end flange (16) at said first through hole (26), said ring (42) providing the locking in position between said first end flange (16) and the end of said pin (36, 36').

* * * * *